(12) United States Patent
Keithley

(10) Patent No.: US 8,976,431 B1
(45) Date of Patent: Mar. 10, 2015

(54) COLOR ADJUSTMENT FOR A SCANNED IMAGE

(71) Applicant: Marvell International Ltd., Hamilton (BM)

(72) Inventor: Douglas G. Keithley, Boise, ID (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/153,906

(22) Filed: Jan. 13, 2014

Related U.S. Application Data

(63) Continuation of application No. 11/811,990, filed on Jun. 13, 2007, now Pat. No. 8,630,031.

(60) Provisional application No. 60/816,720, filed on Jun. 27, 2006.

(51) Int. Cl.
   *G03F 3/08* (2006.01)
   *H04N 1/60* (2006.01)

(52) U.S. Cl.
   CPC .................................... *H04N 1/60* (2013.01)
   USPC ............ 358/518; 358/1.9; 358/474; 358/504; 358/505; 358/523; 358/525; 382/162; 382/167

(58) Field of Classification Search
   None
   See application file for complete search history.

(56) References Cited

U.S. PATENT DOCUMENTS

| | | | |
|---|---|---|---|
| 7,142,238 B1 * | 11/2006 | Sawada et al. | 348/252 |
| 7,535,606 B1 | 5/2009 | Walton et al. | |
| 8,675,058 B2 * | 3/2014 | Donomae et al. | 348/71 |
| 2002/0060688 A1 | 5/2002 | Mizumoto | |
| 2003/0038956 A1 | 2/2003 | Aotsuka | |
| 2003/0052894 A1 | 3/2003 | Akiyama et al. | |
| 2004/0212814 A1 | 10/2004 | Ishigami | |
| 2005/0169522 A1 * | 8/2005 | Schoner | 382/167 |
| 2005/0190205 A1 | 9/2005 | Koyama | |
| 2005/0201617 A1 | 9/2005 | Park et al. | |
| 2005/0219574 A1 * | 10/2005 | Ok et al. | 358/1.9 |
| 2006/0013478 A1 | 1/2006 | Ito et al. | |
| 2006/0239549 A1 * | 10/2006 | Kelly et al. | 382/167 |
| 2007/0247532 A1 | 10/2007 | Sasaki | |
| 2008/0013850 A1 | 1/2008 | Sakurai et al. | |
| 2008/0266314 A1 * | 10/2008 | Butterworth | 345/590 |

* cited by examiner

*Primary Examiner* — Miya J Cato

(57) ABSTRACT

The color of a pixel in a scanned image is represented by two color components and is adjustable by interpolating between color component values obtained from elements in a bidimensional color remap look-up table. The table is sparsely populated and may be readily implemented in most scanner circuits without adding memory.

20 Claims, 2 Drawing Sheets

COLOR ADJUSTMENT FOR A SCANNED IMAGE

CROSS-REFERENCE TO RELATED APPLICATION

This present disclosure is a continuation of U.S. patent application Ser. No. 11/811,990, filed Jun. 13, 2007 (now U.S. Pat. No. 8,630,031), which claims the benefit of U.S. Provisional Patent Application No. 60/816,720, filed Jun. 27, 2006, wherein the entirety of each are hereby incorporated by reference.

FIELD OF THE INVENTION

The present disclosure is related to the field of image scanners. Specifically, the disclosure is directed to adjusting the color of a pixel in a scanned image.

BACKGROUND

An image scanner is a device having a light source and a color image sensor head for generating a digital representation of an image. The light source illuminates the image and the color image sensor head moves across the image field (or the image moves relative to the color image sensor head). The color image sensor head receives light reflected off the image and responsively generates digital image data. The digital image data includes values that correspond to intensity and/or other attributes of color components for each picture element (pixel) in the image.

The accuracy of an image scanner can be a measure of color differential between the original image and the colors represented by the digital image data generated by the color image sensor head. While some color image sensor head models perform well and provide accurate digital image data, some models do not. One example of color inaccuracy is digital image data having color component values that define a yellowish-orange color in areas where the original image is pure yellow.

Color correction techniques exist for adjusting the color component values in the digital image data. Some color correction techniques are implemented at the host computer that receives the digital image data from the scanner. Although color inaccuracies can be corrected at a host computer, the process of correcting the color at the host requires the implementation and use of a graphics editor or other application running on the host, which for many uses and/or users is undesirable or even unacceptable.

Other color correction techniques may be implemented in the scanner before outputting the digital image data. Scanner implemented color correction techniques include simple 3×3 multiplication matrices and full 3-D color space conversion algorithms and tables. 3×3 multiplication matrices are simplistic but in most cases provide nominal color correction. Full 3-D color space conversion techniques are comprehensive but the algorithms consume a lot of processing time and slow down the imaging process, which is usually sensed by the user. Also, implementing a 3-D color space conversion table in a scanner typically requires adding or upgrading a memory device and results in an increased cost of the scanner.

SUMMARY

A method, apparatus, and processor executable instructions are disclosed for adjusting in a scanner the color of a pixel in a scanned image. The color is defined in a two-color component color space by a first color component first value and a second color component first value. The YCrCb color space is one example of a two color component color space, wherein Cr and Cb are the color components and Y is a non-color (luminance) component. A bidimensional look-up table is populated with elements having adjusted color component values. The elements are identified by row and column addresses that correspond to initial color component values. The table is used to remap the initial color component values to the adjusted color component values.

According to a first aspect of the disclosure, the table is sparsely populated relative to the total number of possible initial color component value combinations. Adjusted color component values can be obtained for initial color component values that are between the row and column addresses by interpolating within the table elements.

According to a second aspect of the disclosure, a color image sensor head scans the image and provides a set of three color component values in a three-color component color space for defining the color of a pixel. A circuit is configured to convert the set of three color component values to two values in a two-color component color space. In one version the three-color component color space is a RGB color space and the two-color component color space is a YCbCr color space.

According to another aspect of the disclosure, the scanner is part of a multi-function printer in communication with a host computer.

The preferred embodiments will now be described with reference to the attached drawings.

DETAILED DESCRIPTION OF THE PRESENTLY PREFERRED EMBODIMENTS

Figure 1:
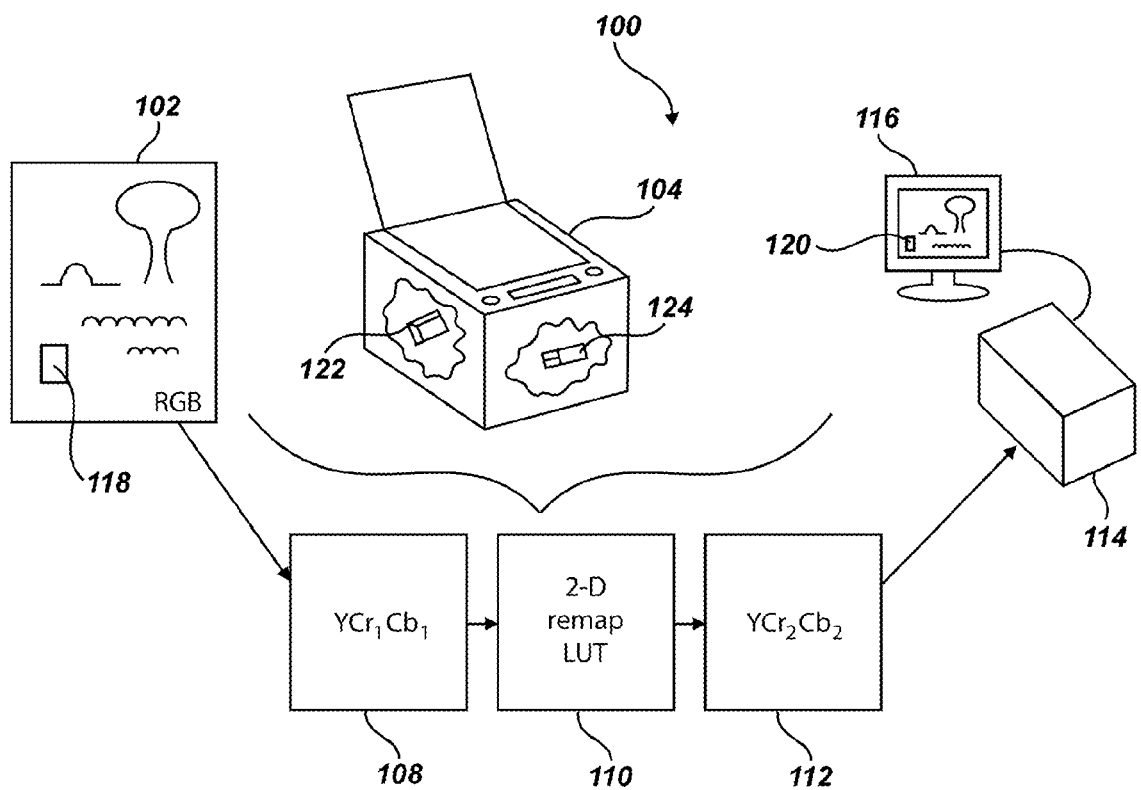
FIG. 1 is an illustration of a preferred process of the present invention for adjusting in a scanner the color of a pixel in a scanned image.

FIG. 1 shows a scanner 104 having a circuit 122 for executing a process 100 for adjusting the color of a pixel 118 in a scanned image 102. It is to be understood that the scanner 104 may be a standalone scanner or part of a multi-function printer (MFP) or other device having a scanner configured to scan an image and output image data for transmission to a host computer 114, monitor 116, or other device for display.

In a preferred version, the circuit 122 adjusts the pixel color and transmits image data from the scanner 104 to a host computer 114 for displaying the pixel 120 on a monitor 116. The circuit 122 may include a processor (not shown) which may be configured to read a memory device (not shown) having processor executable instructions for executing the process 100. The processor may be a software processor, a firmware processor, a hardwire processor, a digital signal processor, a microprocessor, a programmable gate array, a dedicated processor, or other signal processor. The memory device may be RAM, ROM, a flash memory, or other memory device having processor executable instructions for executing the process 100.

In the presently discussed version, the circuit 122 is configured to receive color component values for each pixel based upon data generated by the color image sensor head 124 as the image is scanned. The color component values define levels of pixel attributes, which, depending upon the color space in which the color image sensor head 124 operates, may include color depth, chrominance saturation, luminance, hue, and/or other pixel attributes. For clarity of explanation, aspects of the present invention will be discussed with reference to a color image sensor head 124 operating in the YCrCb color space. It is to be understood that the color image sensor head 124 may operate in other color spaces, including RGB, as discussed below.

The YCrCb color space has a perceptual/non-color component Y to represent luminance, and two color saturation components Cr, for red-minus-luma, and Cb, for blue-minus-luma. It is to be understood that color in the YCrCb color space is dependent upon the saturation levels (e.g., 0 to 255) of the Cr and Cb components. The value of the Y component does not define the color. In this regard, the YCrCb color space is a two-color component color space, in that it does not have a third component also defining color.

In the present version, the circuit 122 is configured to operate in the YCrCb color space. Thus, the circuit 122 receives from the color image sensor head 124 a Y value and $Cr_1$ and $Cb_1$ saturation values 108 for each pixel in the image. To adjust the color of a pixel, the circuit 122 is configured to access remap values to obtain adjusted $Cr_2$ and $Cb_2$ saturation values. In one version, the saturation remap values are obtained from a bidimensional remap look-up table (2-D LUT) 110 in a memory (such as a SRAM or a DRAM) in communication with the circuit 122.

Figure 2:
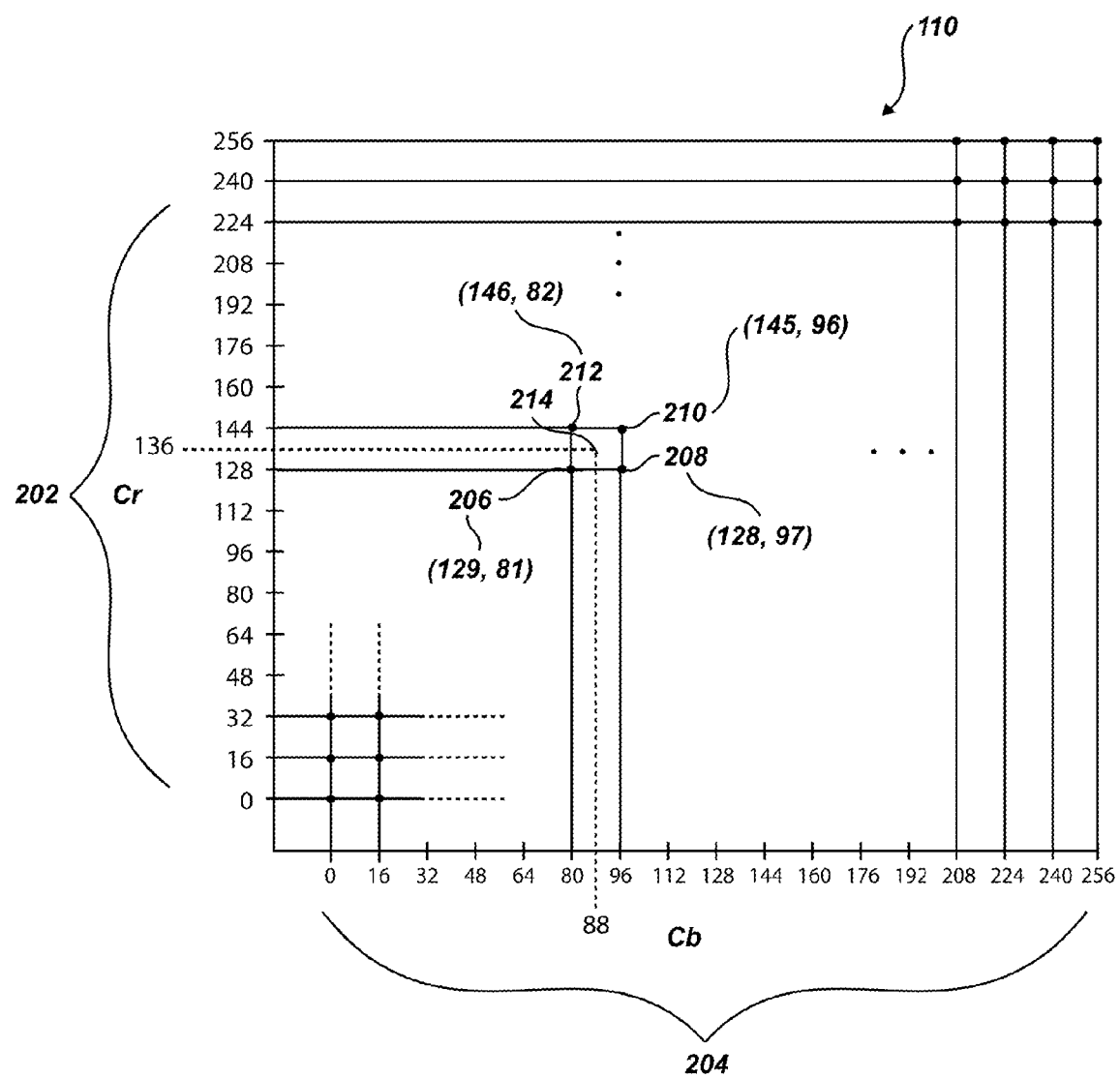
FIG. 2 is bidimensional look-up table populated with color component values for use in adjusting in a scanner the color of a pixel in a scanned image, in accord with a preferred version of the present invention.

One version of a 2-D LUT 110 is shown in FIG. 2. The 2-D LUT 110 is populated with elements (e.g., 206, 208, 210, and 212) having two values. The two values correspond to saturation levels of Cr and Cb color components, respectively. For example, each element may have two 8-bit saturation values, representing the saturation levels of the Cr and Cb color components, respectively. The location of each element in the table is defined by a Cr address value 202 (row) and a Cb address value 204 (column).

The $Cr_1$ and $Cb_1$ saturation values 108 received from the color image sensor head are mapped to element values in the 2-D LUT 110 by Cr and Cb address values. The element values (referred to hereinafter as $Cr_2$ and $Cb_2$) are to replace the $Cr_1$ and $Cb_1$ saturation values for adjusting the color of a pixel. For example, saturation values $Cr_1$=128, $Cb_1$=80 address an element 206 having saturation values $Cr_2$=129 and $Cb_2$=81. Thus, $Cr_1$ and $Cb_1$ saturation values 128 and 80 are replaced with $Cr_2$ and $Cb_2$ saturation values 129 and 81. In operation, the circuit 122 receives saturation values $Cr_1$ and $Cb_1$ corresponding to a first color (from the color image sensor head 124) and outputs saturation values $Cr_2$ and $Cb_2$, corresponding to a second (adjusted) color.

In one version, the 2-D LUT 110 is populated to correct imprecise color representations generated by the color image sensor head 124. The 2-D LUT 110 may be populated to adjust many colors or may be populated to adjust as few as one color. By way of example, if it is known that the color image sensor head 124 provides color component values that correspond to yellow-orange for pure yellow pixels, the element in the 2-D LUT 110 at the yellow-orange address may be populated with color component values that correspond to pure yellow.

A 2-D LUT may be fully or sparsely populated. A fully populated 2-D LUT (not shown) may have an address for every 8-bit color component value, and 16-bit elements (8-bits for each component). A fully populated 2-D LUT may thus comprise 256 rows, 256 columns, 65,536 elements, and require approximately 1M bits of memory.

Referring again to FIG. 2, a sparsely populated 2-D LUT 110 is shown. The 2-D LUT 110 has 8-bit address values, however there are only seventeen 8-bit Cr address values along the row index, and seventeen 8-bit Cb address values along the column index. The table elements provide saturation values for 289 of the possible 65,536 $Cr_1$, $Cb_1$ combinations. This table requires approximately 4.6 k bits of memory and may be readily implemented in most scanner circuits without adding a memory device. In one version, the table is implemented in a memory device, such as an SRAM or DRAM, in an application specific integrated circuit in the scanner of a multi-function printer. The table may be implemented in other types of memory devices as well.

In the sparsely populated version, adjusted saturation values are obtained from the table by interpolation. For example, adjusted saturation values can be obtained from the table for $Cr_1$=136 and $Cb_1$=88 by retrieving the Cr and Cb saturation values in the four closest elements 206, 208, 210, and 212. In the illustrated example, all four elements are equidistant from point 214. According to one method of interpolation, the saturation value of $Cr_2$ is obtained by averaging the Cr saturation values of elements 206, 208, 210, and 212, where Cr=129, 128, 145, and 146, respectively, and therefore $Cr_2$=137. The saturation value of $Cb_2$ is obtained by averaging the Cb saturation values of elements 206, 208, 210, and 212, where Cb=81, 97, 96, and 82, respectively, and therefore $Cb_2$=89. Based on the disclosure and teachings provided herein, other methods of interpolating in M×M×2 tables may be used.

The versions discussed above have been described in connection with adjusting image pixel colors provided by a color image sensor head 124 operating in a two color component (YCbCr) color space. Other versions of the disclosed embodiments may be implemented in scanners having color image sensor heads operating in other color spaces, including those having three or more color components, such as the RGB color space. In such versions, the scanner 104 may be configured to convert a three or more color component color space to a two color component color space (such as YCrCb) before adjusting the color. Techniques for converting image data from three or four color component color spaces to two color component color spaces include transformation and conversion formulas that are well known to those skilled in the art. Such techniques may be implemented by a circuit, such as the scanner circuit 122, in communication with the color image sensor head 124, and may be implemented by software, firmware, or hardware.

The scanner circuit 122, or another circuit, may be configured to convert the adjusted color to another color space. For example, the scanner circuit 122 may be configured to convert an adjusted color from the YCrCb color space to the RGB color space before communicating the adjusted color to another device, such as a host computer.

It is intended that the foregoing detailed description be understood as an illustration of selected forms that the invention can take and not as a definition of the invention. It is only the following claims, including all equivalents, that are intended to define the scope of this invention.

What is claimed is:

1. A method of adjusting image data, comprising:
   receiving the image data corresponding to one or more pixels of an image;
   identifying a first color component value and a second color component value for a pixel in the image data within a two-color component color space;

inputting the first color component value and the second color component value into a two-dimensional lookup table (2-D LUT);
responsive to inputting the first color component value and the second color component value into the 2-D LUT, outputting a first color component adjustment value and a second color component adjustment value from the 2-D LUT;
generating an adjusted first color component value by applying the first color component adjustment value to the first color component value;
generating an adjusted second color component value by applying the second color component adjustment value to the second color component value;
wherein the 2-D LUT is configured to be populated with color component adjustment values to correct for a known imperfection in an image capturing device having captured the image wherein the known imperfection is associated with the image capturing device, the known imperfection being a measure of a difference between colors captured by the image capturing device and known colors.

2. The method of claim 1, wherein at least one of the first color component adjustment value and the second color component adjustment value is based on an interpolation of a plurality of neighboring adjustment values from the 2-D LUT.

3. The method of claim 2, wherein the interpolation is based on an interpolation of the four closest color component adjustment values in the 2-D LUT.

4. The method of claim 3, wherein the four closest color component adjustment values in the 2-D LUT are equidistant from the first color component adjustment value or the second color component adjustment value.

5. The method of claim 1, further comprising:
transmitting an adjusted pixel comprised of the adjusted first color component value and the adjusted second color component value to a display device.

6. The method of claim 1, further comprising:
receiving from the image capturing device, a set of three color component values in a three-color component color space for defining the image; and
converting the set of three color component values to the first color component value and the second color component value of the two-color component color space; and
wherein the three-color component color space is a RUB color space.

7. The method of claim 1, wherein the first color component adjustment value and the second color component adjustment value included in the 2-D LUT are saturation remap values.

8. The method of claim 1, wherein the color component adjustment values populating the 2-D LUT reflect the known imperfection of the image capturing device.

9. A non-transitory computer readable storage medium having processor executable instructions, the processor executable instructions executed by a processor to:
receive image data corresponding to one or more pixels of an image;
identify a first color component value and a second color component value for a pixel in the image data within a two-color component color space;
input the first color component value and the second color component value into a two-dimensional lookup table (2-D LUT);
responsive to inputting the first color component value and the second color component value into the 2-D LUT, output a first color component adjustment value and a second color component adjustment value from the 2-D LUT;
generate an adjusted first color component value by applying the first color component adjustment value to the first color component value;
generate an adjusted second color component value by applying the second color component adjustment value to the second color component value;
wherein the 2-D LUT is configured to be populated with color component adjustment values to correct for a known imperfection in an image capturing device having captured the image wherein the known imperfection is associated with the image capturing device, the known imperfection being a measure of a difference between colors captured by the image capturing device and a known color.

10. The non-transitory computer readable storage medium of claim 9, wherein at least one of the first color component adjustment value and the second color component adjustment value is based on an interpolation of a plurality of neighboring adjustment values from the 2-D LUT.

11. The non-transitory computer readable storage medium of claim 10, wherein the interpolation is based on an interpolation of the four closest color component adjustment values in the 2-D LUT.

12. The non-transitory computer readable storage medium of claim 11, wherein the four closest color component adjustment values in the 2-D LUT are equidistant from the first color component adjustment value or the second color component adjustment value.

13. The non-transitory computer readable storage medium of claim 9, the processor further executing the instructions to:
transmit an adjusted pixel comprised of the adjusted first color component value, the adjusted second color component value to a display device.

14. The non-transitory computer readable storage medium of claim 9, the processor further executing the instructions to:
receive from the image capturing device, a set of three color component adjustment values in a three-color component color space for defining the image; and
convert the set of three color component sensor values to the first color component value and the second color component value of the two-color component color space; and
wherein the three-color component color space is a RUB color space.

15. The non-transitory computer readable storage medium of claim 9, wherein the image capturing device is part of a multi-function printer or page scanner.

16. The non-transitory computer readable storage medium of claim 9, wherein the first color component adjustment value and the second color component adjustment value included in the 2-D LUT are saturation remap values.

17. An electronic apparatus, comprising:
a memory configured to store a two-dimensional lookup table (2-D LUT);
a controller in communication with the memory, the controller configured to:
receive image data comprised of information corresponding to one or more pixels of an image;
identify a first color component value and a second color component value for a pixel in the image data within a two-color component color space;

input the first color component value and the second color component value into the 2-D LUT;
responsive to inputting the first color component value and the second color component value into the 2-D LUT, output a first color component adjustment value and second color component adjustment value from the 2-D LUT;
generate an adjusted first color component value by applying the first color component adjustment value to the first color component value;
generate an adjusted second color component value by applying the second color component adjustment value to the second color component value;
wherein the 2-D LUT is configured to be populated with color component adjustment values to correct for a known imperfection in an image capturing device having captured the image wherein the known imperfection is associated with the image capturing device, the known imperfection being a measure of a difference between colors captured by the image capturing device and a known color.

18. The electronic apparatus of claim 17, wherein at least one of the first color component adjustment value and the second color component adjustment value is based on an interpolation of a plurality of neighboring adjustment values from the 2-D LUT.

19. The electronic apparatus of claim 17, wherein the processor is further configured to:
receive from the image capturing device, a set of three color component adjustment values in a three-color component color space for defining the image; and
convert the set of three color component sensor values to the first color component value and the second color component value of the two-color component color space.

20. The electronic apparatus of claim 19, wherein the three-color component color space is a RGB color space, and the first color component sensor value corresponds to a R component, the second color component corresponds to a G component, and the third color component corresponds to a B component.

* * * * *